US006725028B2

United States Patent
Bonaccorso et al.

(10) Patent No.: US 6,725,028 B2
(45) Date of Patent: Apr. 20, 2004

(54) RECEIVING STATION WITH INTERFERENCE SIGNAL SUPPRESSION

(75) Inventors: Mario Bonaccorso, Catana (IT); Fuyun Ling, San Diego, CA (US); Nagabhushana Sindhushayana, San Diego, CA (US); Peter Black, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 458 days.

(21) Appl. No.: 09/870,958

(22) Filed: May 30, 2001

(65) Prior Publication Data

US 2001/0053678 A1 Dec. 20, 2001

Related U.S. Application Data

(63) Continuation of application No. 09/332,857, filed on Jun. 14, 1999, now Pat. No. 6,285,861.

(51) Int. Cl.[7] .................................................. H04B 1/10
(52) U.S. Cl. ...................... 455/296; 455/63.1; 455/273; 375/316; 375/346
(58) Field of Search ................................ 455/137, 296, 455/132, 139, 140, 151.11, 161.2, 292.1, 292.2, 293.1, 295.1, 271, 272, 273, 63.1, 114.2, 114.3, 278.1; 375/147, 144, 148, 346, 348, 349, 316

(56) References Cited

U.S. PATENT DOCUMENTS

| 4,672,638 | A | * | 6/1987 | Taguchi et al. | 375/346 |
|---|---|---|---|---|---|
| 5,287,067 | A | * | 2/1994 | Denno et al. | 329/304 |
| 5,442,627 | A | * | 8/1995 | Viterbi et al. | 370/209 |
| 5,602,833 | A | * | 2/1997 | Zehavi | 370/209 |
| 5,764,687 | A | * | 6/1998 | Easton | 375/147 |
| 5,809,058 | A | * | 9/1998 | Sato | 375/148 |
| 5,881,057 | A | * | 3/1999 | Komatsu | 370/335 |
| 6,058,138 | A | * | 5/2000 | Fukumasa et al. | 375/130 |
| 6,275,186 | B1 | * | 8/2001 | Kong | 342/363 |

* cited by examiner

*Primary Examiner*—Cong Van Tran
(74) *Attorney, Agent, or Firm*—Philip Wadsworth; Kent D. Baker; Sandra L. Godsey (57) ABSTRACT

An optimum combiner that reduces the amount of interference imposed upon a first base station by transmissions of other base stations within the same communication system. Two antennas are used to receive transmissions within a receiving station. A rake receiver is coupled to each antenna. By optimally combining the signals that are received by each independent finger of the rake receiver, interference that is correlated between a finger associated with the first antenna and a finger associated with the second antenna can be minimized with respect to the desired signal. Optimum combining requires determination of optimum combining coefficients.

11 Claims, 9 Drawing Sheets

RECEIVING STATION WITH INTERFERENCE SIGNAL SUPPRESSION

CROSSREFERENCE

This application for patent is a continuation of U.S. patent application Ser. No. 09/332,857 filed Jun. 14, 1999, entitled "RECEIVING STATION WITH INTERFACE SIGNAL SUPPRESSION," by Mario Bonaccorso, et al., now U.S. Pat. No. 6,285,861, issued on Sep. 4, 2001.

This application for patent is related to U.S. patent application Ser. No. 09/414,125 filed Oct. 8, 1999, entitled "SELECTION MECHANISM FOR SIGNAL COMBINING METHODS," by Fuyun Ling, assigned to the assignee hereof, now U.S. Pat. No. 6,466,558, issued on Oct. 15, 2002.

RELATED FIELD

This disclosed method and apparatus relates to wireless communications systems, and more specifically to suppressing interference.

BACKGROUND

In a conventional wireless communications system, a mobile station (cellular telephone, portable computer, etc.) is served by a network of base stations. Such base stations serve as the communication relay station for mobile stations. Accordingly, a mobile station must be in wireless communication with at least one base station whenever the mobile station is turned on in order to communicate with the other components of a communications system. Mobile stations sometimes move out of a region served by one base station and into a region served by another base station. Base stations note this fact, and "hand-off" communication from the first base station to the second. It is common for a mobile station to be in communication with both the first and second base station for periods of time. A mobile station that is in communication with more than one base station is said to be in "soft handoff." In some cases, a mobile station will be in soft handoff with more than two base stations at any one time.

Soft handoff is desirable because it reduces dropped calls. In addition, soft handoff allows the mobile unit to receive the same information from more than one source and to use all of this received information (or energy) to assist in decoding the information that is being transmitted to the mobile station by each base station. Using information transmitted from more than one base station means that the power level that is required from any one base station is reduced.

One type of wireless communication system is known as Code Division Multiple Access (CDMA). CDMA systems offer greater capacity than other systems. That is, the number of channels of information that can be communicated concurrently is greater in CDMA systems than in other systems, such as a time division multiple access (TDMA) system or a frequency division multiple access (FDMA) system.

In CDMA systems in which both voice and data are being communicated, base stations transmit to as many mobile stations as are in the coverage area for that base station on the same frequency at the same time. In addition, each such base station transmits at the same frequency as every other base station in the network. Signals transmitted to a particular mobile station are distinguishable from signals transmitted to other mobile stations only by the fact that they are transmitted using different codes. In contrast, in a TDMA system, transmissions to a first mobile station are sent during a first period of time and transmissions to a second mobile station are sent during a second, non-overlapping period of time. In an FDMA system, transmissions to a first mobile station are transmitted on a first frequency and transmissions to a second mobile station are transmitted on a second frequency. Because a CDMA receiver can receive more than one channel at a time while tuned a single frequency, a CDMA receiver can more conveniently perform soft handoff then can a TDMA receiver or an FDMA receiver.

While CDMA systems have the advantage of being ideally suited for soft handoff, signals transmitted to a first mobile station using a first code appear as noise to a second mobile station attempting to receive signals transmitted to the second mobile station using a second code. This interference is preferably minimized by making the codes assigned to signals transmitted from a base station orthogonal with codes assigned to all other signals being transmitted by that base station. However, codes used with signals that are transmitted by a first base station can not be made orthogonal with codes used with signals transmitted by a second base station. Therefore, base stations carefully regulate the amount of power used to transmit signals to mobile stations. The power must be high enough to get the signal through, but the power is preferably no higher than necessary, since additional power appears to other mobile stations as additional interference and reduces the number of mobile stations that can be served.

Because conventional CDMA communication systems must handle both voice and data, certain performance requirements must be met. One such requirement is that the delay between the time the information is transmitted from one end of the communication system until the time the information is received at the other end of the communication system must be relatively short. That is, when two people are talking, any perceptible delay between the time words are spoken at one end of the line and the time those words are heard at the other end of the line would be annoying to both the speaker and the listener.

In contrast, many data communication systems can tolerate relatively long delays between the time information is sent and that information is received. CDMA systems have recently been proposed that take advantage of the fact that relatively long delays can be tolerated in systems designed to handle only data. Such systems are referred to herein as high data rate (HDR) systems. In HDR systems, a base station is dedicated to communicating with only one mobile station at any one time. The capacity advantages of CDMA are realized with HDR systems. However, it may be difficult or undesirable to perform soft handoff due to the following reasons. First, the transmissions from a base station in an HDR system are all directed to one mobile station at any particular time. Therefore, while the number of code channels being transmitted from an HDR base station is essentially the same, all of the code channels are intended to be received by one mobile station at any one time. As a result, it is complex to coordinate the times of transmission between two base stations in order to allow soft handoff between the two base stations. Second, in order to perform soft handoff, it is necessary to distribute the same data between more than one base station. This will greatly increase the amount of data to be transferred between base stations, especially for high data rate applications. Third, system capacity increases if the mobile unit can always connect to the best serving base station instead of using soft handoff, assuming that the channel condition is relatively static, as is likely for an HDR system. This is true, since an HDR base station typically transmits at maximum power to allow the best data rate. That is, the rate at which data can be transmitted is directly proportional to the amount of power received. Therefore, in order to maximize the data rate, the maximum power is transmitted. However, this increases the amount of interference a first base station contributes to the signals received by mobile stations attempting to receive signals from a second base station.

Accordingly, there is a need for a method and apparatus for reducing the amount of interference that a first base station contributes to mobile stations attempting to receive signals from one or more other base stations.

SUMMARY OF THE PRESENTLY DISCLOSED METHOD AND APPARATUS

The presently disclosed method and apparatus reduces the amount of interference imposed upon a first base station by transmissions of other base stations within the same communication system. The presently disclosed method and apparatus takes into account the fact that soft handoff is not easily implemented or undesirable in some communication systems, such as a high data rate (HDR) communication system in which multiple code channels are being transmitted to one receiving station, such as a mobile station, at a time. That is, in a typical HDR system, each base station is transmitting to only one receiving station at a time. To coordinate the times of transmission and data transfer between two base stations in order to allow soft handoff between two base stations is complex. Moreover, the capacity of the HDR system may increase by not using soft handoff under typical channel conditions. Therefore, the presently disclosed method and apparatus deviates from the traditional approach of performing soft handoff and relies on techniques that use two or more antennas for decreasing the interference between transmissions from a first base station and transmissions from one or more other base stations.

In accordance with the presently disclosed method and apparatus, two antennas are used to receive transmissions within a receiving station. A rake receiver is coupled to each antenna. The rake receiver has a plurality of fingers, each finger having the ability to identify and independently decode signals arriving with different propagation delays (i.e., the delay encountered between the time the signal is transmitted and the time the signal is received). By optimally combining the signals that are received by each independent finger of the rake receiver, interference that is correlated between a finger associated with the first antenna and a finger associated with the second antenna can be minimized with respect to the desired signal. Optimum combining requires determination of optimum combining coefficients as follows.

Optimum combining coefficients for each of the signals received by the fingers of the rake receiver are determined by first pairing the output from a first finger associated with the first antenna with the output from a second finger associated with the second antenna. The first finger receives the desired signal with essentially the same propagation delay as the second finger. That is, the path of the signal decoded by the first finger and the path of the signal decoded by the second finger differ only because the first finger is associated with the first antenna and the second finger is associated with the second antenna. An autocorrelation matrix is estimated. In one of the presently disclosed methods and apparatus, the autocorrelation matrix is an estimate of the autocorrelation of the received signals. Alternatively, the autocorrelation matrix is an estimate of the autocorrelation of the received noise plus interference.

In addition, the cross-correlation between the received signal and the transmitted symbol is estimated by estimating the elements of a fading coefficient vector. Each element of the fading coefficient vector is a fading coefficient associated with one of the signal paths traversed by the signals received by the rake receiver. The fading coefficient vector is preferably estimated based on the pilot bursts received on each finger.

The autocorrelation matrix of the noise plus the interference is estimated from the received noise component of each of the signals received by the fingers of the rake receiver. The received noise component for a particular finger is calculated by subtracting the fading coefficient associated with the signal received by that finger from the total signal received by that finger in the pilot bursts. In another of the presently disclosed methods and apparatus, the noise and interference is estimated by subtracting the signal y(m) from the signal y(m+1) one chip later in time (i.e., subtracting adjacent samples). In yet another of the presently disclosed methods and apparatus, the autocorrelation matrix of the noise plus interference $R_{nn}$ is estimated by subtracting the fading coefficient vector multiplied by the transpose conjugate of the fading coefficient vector, from the autocorrelation matrix $R_{yy}$ of the received signal y(m).

Once the fading coefficient vector and the autocorrelation matrix of the signal received by each pair of fingers has been calculated, these values are used to calculate the optimum combining coefficients. Alternatively, once the fading coefficient vectors and the autocorrelation matrix of the noise plus interference for each pair of fingers have been calculated, they are used to calculate the optimum combining coefficients.

Upon combining the signals received by each finger of the rake receiver using the optimum combining coefficients, it is desirable to calculate the signal to interference plus noise ratio of the output from the optimum combiner. This ratio is calculated using the transpose conjugate of the optimum combining coefficients and the fading coefficient vector. The result is a system in which interference from sources other than the source of the desired signal is suppressed with respect to the desired signal to improve decoding. The resulting signal to noise plus interference is calculated to allow a receiving station so equipped to determine the data rate that the channel can support.

DETAILED DESCRIPTION

Figure 1:
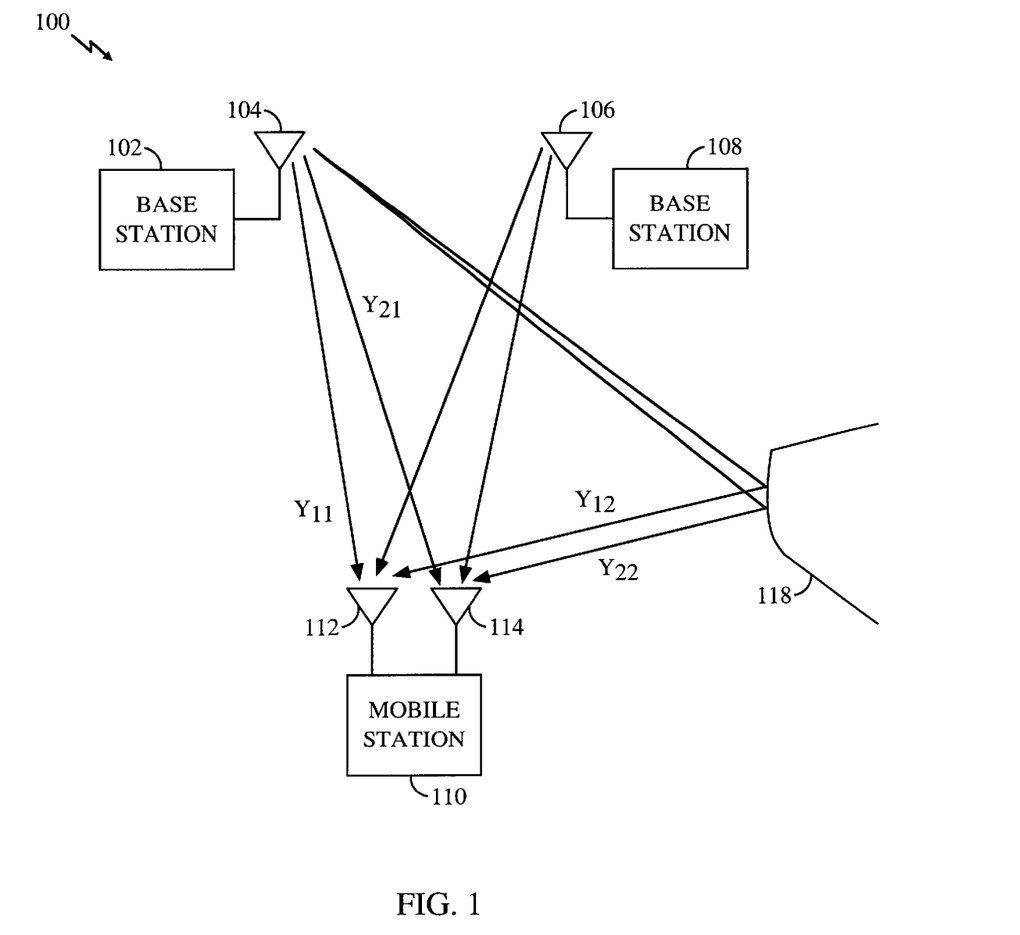
FIG. 1 is a schematic drawing of a wireless network according to the presently disclosed method and apparatus.

FIG. 1 is a schematic drawing of a wireless network 100 according to the presently disclosed method and apparatus. In one of the presently disclosed methods and apparatus, the wireless network 100 is a code division multiple access (CDMA) high data rate (HDR) system. A first base station 102 has an antenna 104. The first base station 102 transmits signals that are intended to be received by a receiving station 110, such as a mobile station, having two antennas 112, 114. The signals that are transmitted by the first base station 102 are shown to traverse two distinct paths from the first base station 102 to the two antennas 112, 114 of the receiving station 110. Accordingly, four desired signals ($y_{11}$, $y_{12}$, $y_{21}$, $y_{22}$) are received at the receiving station 110 from the base station 102. Each desired signal is delayed a different amount (i.e., has a different propagation delay) due to the different paths traversed. The first subscript associated with a desired signal is indicative of the antenna that received the signal. The second subscript associated with a desired signal is indicative of the propagation delay encountered by the signal.

It should be noted that while $y_{11}$, $y_{21}$ do not traverse exactly the same path (i.e., they are received by different antennas as indicated by the first subscript) their delays are essentially equal when contrasted against the delays of $y_{12}$ and $y_{22}$. That is, the difference in the propagation delay between the signals $y_{11}$ and $y_{21}$ will be far less than the difference in the propagation delay between the signal $y_{11}$ and either $y_{12}$, or $y_{22}$, since the paths traversed by signals $y_{12}$ and $y_{22}$ are far longer than the path traversed by signal $y_{11}$. Likewise, the difference in the propagation delay between the signals $y_{12}$ and $y_{22}$ will be far less than the difference in the propagation delay between the signal $y_{12}$ and either $y_{21}$, or $y_{11}$, since the path traversed by signals $y_{21}$ and $y_{11}$ is far shorter than the path traversed by the signal $y_{12}$.

A second signal source also transmits signals being received by the receiving station 110. For simplicity, the second signal source is described throughout this document as a second base station 108 having an antenna 106. However, it will be understood by those skilled in the art that the second signal source may be a second antenna associated with the same or another base station, or different portion of the same antenna transmitting from the same base station. However, the signals being transmitted by the second base station 108 are not intended to be received by the receiving station 110. The base stations 102 and 108 each transmit broadband signals over the same frequency band. Therefore, the signals that are being received by the receiving station 110 from the second base station 108 interfere with the reception by the receiving station 110 of the signals transmitted from the first base station 102.

For ease of understanding, only two base stations 102, 108 are shown. However, it will be clear to those skilled in the art that more than two base stations may be transmitting. Furthermore, the receiving station 110 is shown to have only two antennas 112, 114. However, in one of the presently disclosed methods and apparatus, additional antennas may be provided on the receiving station 110.

In the presently disclosed method and apparatus, the receiving station 110 uses the signals received by the two antennas 112, 114 to assist in suppressing interference from signal sources that are transmitted from different antennas, or portions of an antenna, than the desired signal.

Figure 2A:
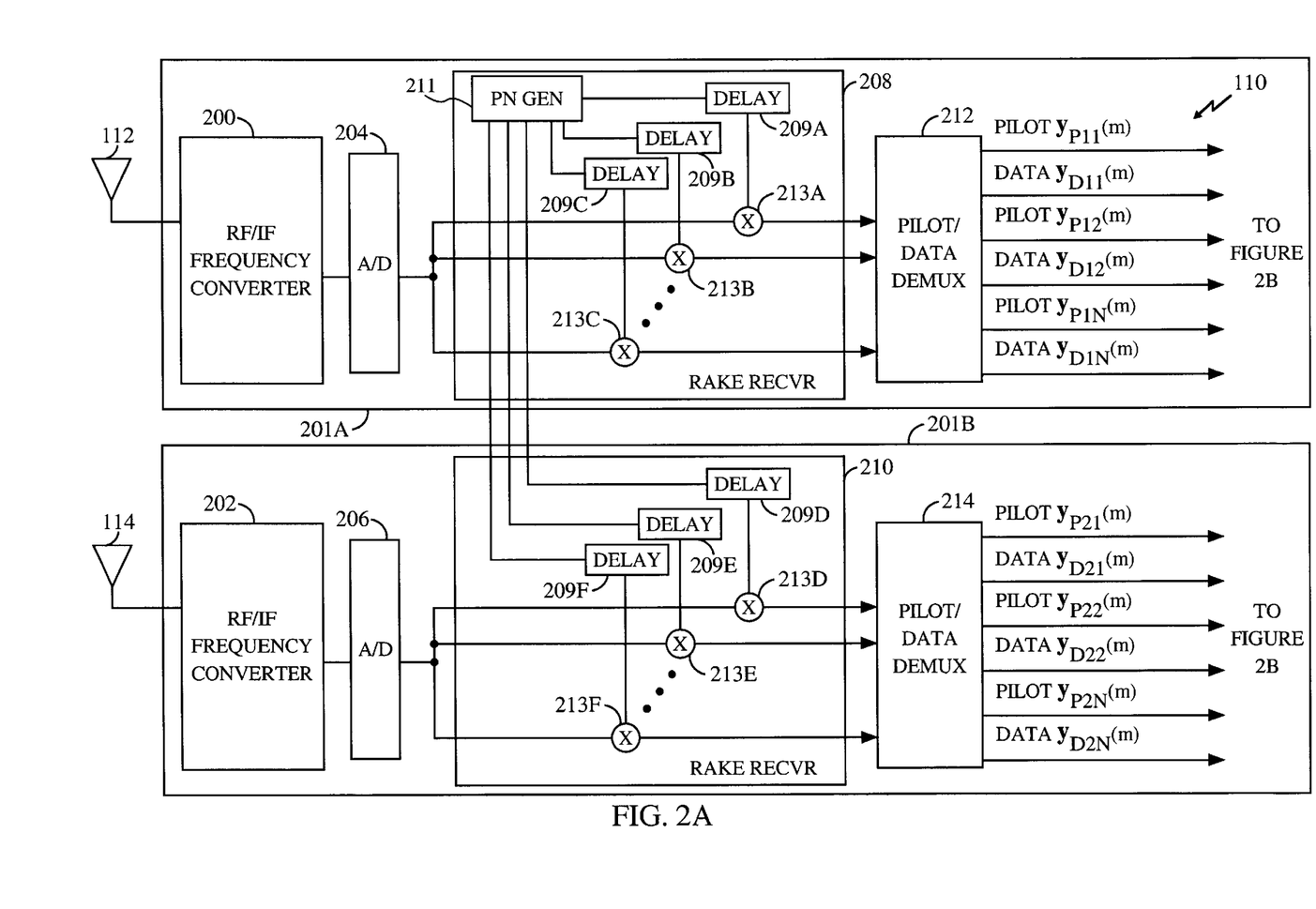
FIGS. 2A and 2B taken together are a simplified block diagram of a receiving station of the presently disclosed method and apparatus.
Figure 2B:
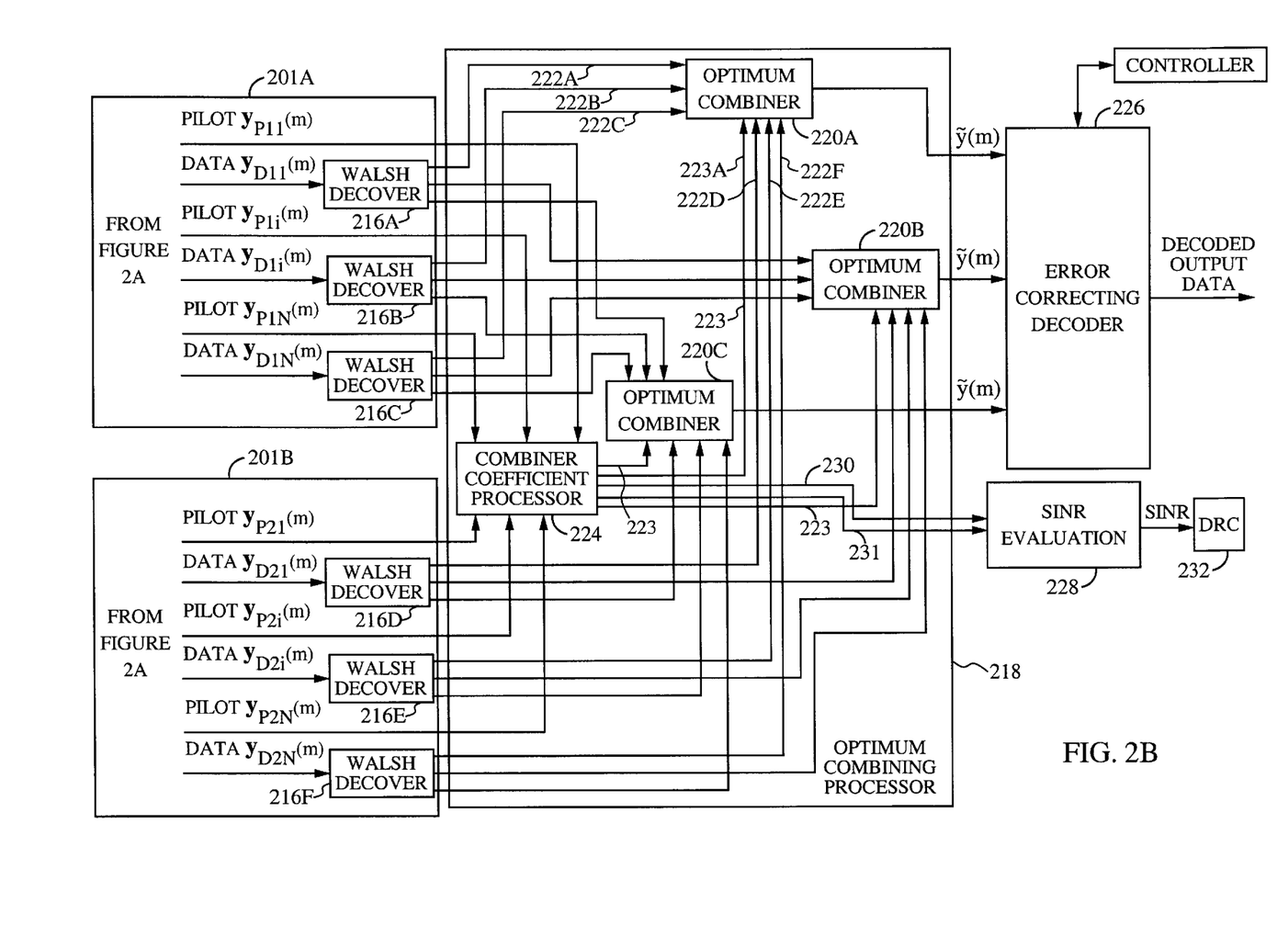

FIGS. 2A and 2B taken together are a simplified block diagram of a receiving station 110 of the presently disclosed method and apparatus. As noted above, incoming signals are received at the receiving station 110 over each of the two antennas 112, 114. The receiving station 110 preferably includes two receiver modules 201A, 201B. Each receiver module 201 includes: a radio frequency/intermediate frequency (RF/IF) converter 200, 202; an analog to digital (A/D) converter 204, 206; a rake receiver 208, 210, a pilot/data demultiplexer (demux) 212, 214; and a plurality of Walsh decover modules 216A, 216B, 216C, 216D, 216E, 216F.

Each of the two RF/IF converters 200, 202 is coupled to an associated one of the two antennas 112, 114. Accordingly, signals received over each of the two antennas 112, 114 are coupled to the corresponding radio RF/IF converters 200, 202.

Each RF/IF converter 200, 202 is coupled to a corresponding one of two A/D converters 204, 206. The A/D converters 204, 206 convert the output from the RF/IF converter 200, 202 into a digital form. Alternatively, a single A/D converter may be used to convert the received analog signals from both antennas to digital form. Each A/D converter 204, 206 is coupled to a corresponding one of two rake receivers 208, 210.

Each rake receiver 208, 210 is capable of distinguishing between each of the signals that have originated from a desired source base station and that encounter different propagation delays to get to the receiving station 110. Rake receivers used in CDMA receivers are well known in the art for receiving and discriminating between CDMA signals. Since signals $y_{11}$, $y_{12}$, $y_{21}$, $y_{22}$ encounter different delays, a conventional rake receiver is capable of distinguishing between these signals. Each signal $y_{11}$, $y_{12}$, $y_{21}$, $y_{22}$ from the desired source (i.e., the base station 102) that has a distinguishable delay is assigned to a unique "finger" 213A, 213B, 213C, 213D, 213E, 213F of the rake receiver 208, 210. Each such finger 213 outputs a signal that is despread with a delayed pseudo-random noise (PN) code generated by a PN generator 211. The PN code output from the generator 211 is delayed by one of a plurality of delay modules 209A, 209B, 209C, 209D, 209E, 209F. The amount of the delay imposed by each delay module 209 is set such that the PN code output from each delay module 209 is synchronized to the PN code with which the signals received from the desired source base station 102 were originally spread, plus the propagation delay encountered in transmission from the base station 102 to the receiving station 110.

It should be noted that the signals transmitted by each base station 102, 108 may be spread (i.e., encoded) with the same PN code. However, a substantially different delay is imposed with respect to the start of the PN sequence used to encode the signals from each base station 102, 108. The difference in the delay is substantially greater than the delay between any two signals that would arrive at the receiving station 110 from the same base station 102 over different paths. Therefore, by spreading signals transmitted from different base stations with the same PN code, but with substantially different delays, signals from a first base station 102 can be distinguished from signals from a second base station 108. Furthermore, signals transmitted from the first base station 102 to the receiving station 110 have a different propagation delay than signals transmitted from the base station 108 to the receiving station 110. Accordingly, these signals can be distinguished from one another. It should be noted that none of the delay modules 209 are set to promote reception of the signals transmitted by the second base station 108.

In a base station generating signals to be received by one of the presently disclosed methods and apparatus, a pilot signal is time multiplexed with data. In one such base station 102, the pilot and each data stream are covered (i.e., encoded) with a different Walsh code. The pilot is preferably covered with the Walsh code that has a constant value, making decovering the pilot channel less difficult. During the time when the pilot channel is being transmitted (i.e., the pilot burst), no data is transmitted. Two such pilot bursts occur in each forward link slot. A forward link slot is a predetermined period of time within the signal transmitted from a base station to a receiving station. During the time (i.e., the data field) when the data is being transmitted, the pilot channel is not transmitted. The data is code multiplexed. That is, the data is divided into separate data streams. Each data stream is covered with a different Walsh code. All of the data streams are then transmitted at the same time. For example, a first portion of the data is covered with a first Walsh code, a second portion of data is covered with a second Walsh code, and a third portion of data is covered with a third Walsh code. The first, second, and third portions are then all transmitted by the base station at the same time during the data field.

Since the data and pilot are transmitted in time multiplexed format, in one of the presently disclosed methods and apparatus, the receiving station 110 includes one pilot/data demux 212, 214 associated with each of the antennas 112, 114. However, a single demux may be provided for demultiplexing the signals received by both of the antennas 112, 114. The output from the first demux 212 is a plurality of pilot streams $y_{p11}(m), y_{p12}(m), \ldots y_{p1N}(m)$ and a plurality of data streams $y_{d11}(m), y_{d12}(m), \ldots y_{d1N}(m)$, where $y_{p11}(m)$ indicates a series of pilot samples, each taken at a time "mT" over the pilot channel received on antenna 1, with propagation delay 1, and where $y_{d11}(m)$ indicates a series of data samples, each taken at a time "mT" over the data channel received on antenna 1, delay 1, and where "m" is an integer and "T" is a time equal to one data chip in duration.

Each pilot and data stream having the same numeric subscripts is associated with the same finger 213 of the rake receiver 208, 210. Each data stream is coupled to Walsh decover module 216A, 216B, 216C, 216D, 216E, 216F. Each Walsh decover module 216 separates the code channels that were code multiplexed into the data field prior to transmission from the base station 102. The output from the Walsh decover modules 216A, 216B, 216C, 216D, 216E, 216F are separate data streams that have been decovered, as is well known to those skilled in the art. These pilot and data signals are then coupled to an optimum combining processor 218.

The optimum combining processor 218 shown in FIG. 2B includes three optimum combiners 220A, 220B, 220C and a combiner coefficient processor 224. It should be noted that each optimum combiner 220 is associated with a corresponding one code channel (i.e., Walsh code used to cover the data transmitted over that code channel). That is, if each the Walsh decover module 216 puts out three data streams (each associated with a different code channel and having been decovered by a different Walsh code), then there will be three optimum combiners 220 that will be used. However, it should be understood that in an alternative method and apparatus, the number of code channels and optimum combiners 220 may differ from the three shown in FIG. 2B. Furthermore, it should be noted that a single module can perform the functions of more than one optimum combiner. Each optimum combiner 220 is coupled to all of the Walsh decover modules 216, providing each optimum combiner 220 with the data transmitted on one code channel via multiple paths received over both antennas. The output from each optimum combiner 220 is a stream of data symbols representing the data that modulates the signals transmitted by the base station 102. Due to the processing by the optimum combining processor 218, the interference encountered when decoding the symbols is less than would result from a conventional combining of the input to the optimum combiner 220. That is, the SINR of the signals modulated with the output symbols is greater than the SINR of any of the data streams input to the optimum combiner 220. Furthermore, the SINR of the output symbols is greater than would result from a conventional combining of the inputs to the optimum combiner 220.

Figure 3:
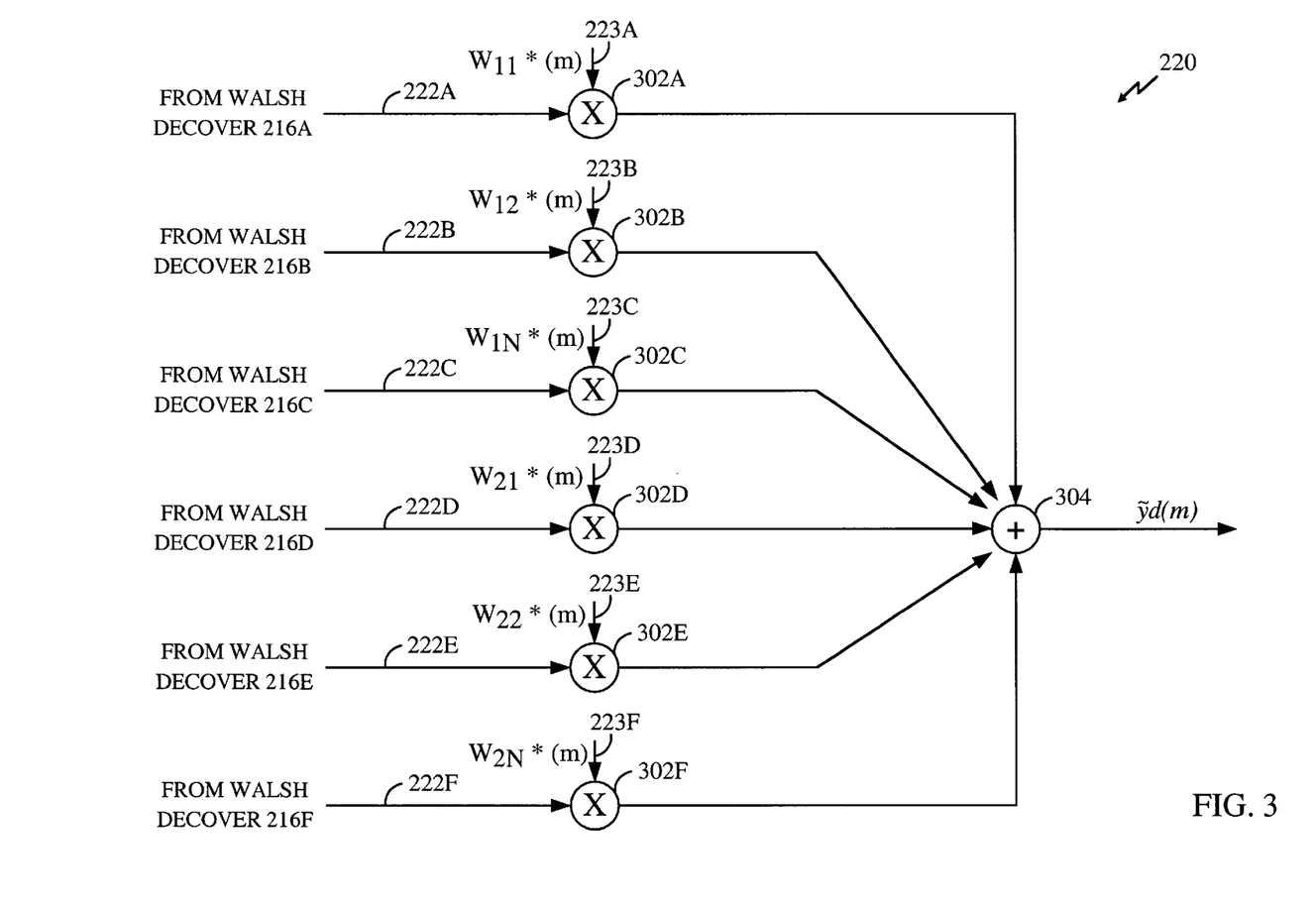
FIG. 3 is a simplified block diagram of one optimum combiner of one of the presently disclosed methods and apparatus.

FIG. 3 is a simplified block diagram of one optimum combiner 220A in one of the presently disclosed methods and apparatus. Since each optimum combiner 220 is essentially identical, only one such optimum combiner 220A will be described. The optimum combiner 220A includes a plurality of two input multiplication modules 302. The multiplication modules 302 multiply the signal at the first input with the signal at the second input and provide the product at the output of the multiplication module 302. It should be noted that the multiplication modules 302 may be implemented as a function performed by a programmable device (such as a general purpose processor or a DSP) or as dedicated hardware or programmable logic, or in any other manner that allows the multiplication function to be carried out (such as circuitry or processing functionality within an application specific integrated circuit (ASIC)).

The number of multiplication modules 302 in an optimum combiner 220 is preferably equal to the total number of Walsh decover modules 216 in the receiving station 110. A first input to each multiplication module 302 is coupled to a unique corresponding one of the Walsh decover modules 216. Accordingly, each data stream received on the one code channel associated with the optimum combiner 220A is coupled to a first input of the particular two input multiplication module 302a that is associated with that Walsh decover module 216A. In the method and apparatus shown in FIG. 2, there are six decover modules 216A, 216B, 216C, 216D, 216E, 216F. Accordingly, six multiplication modules 302A, 302B, 302C, 302D, 302E, 302F are shown in the optimum combiner 220A of FIG. 3. A second input to each multiplication module 302 is coupled to the combiner coefficient processor 224 by signal line 223. The combiner coefficient processor 224 calculates optimum combining coefficients $(w_{ij}*(m))$. The subscript "i" represents the particular antenna associated with a finger 213 and the subscript "j" represents the particular delay encountered by a signal transmitted from a desired source. As noted above, while the paths traversed by signals received by the two antennas 112, 114 (such as signals $y_{11}$ and $y_{21}$ shown in FIG. 1) are not identical due to the fact that the signals are received by different antennas, the same second subscript is used to denote that these signals have encountered essentially equal propagation delays. Similarly, the second subscript of the optimum combining coefficients indicates which propagation delay was encountered by the signal to be multiplied with that optimum combining coefficient.

The multiplication performed by the multiplication modules 302 allows each received signal to be weighted and rotated (i.e., the phase and amplitude of the received signals can be adjusted). By rotating the phase, the signal to interference plus noise ratio (SINR) of the combined signal output from the summing module 304 is optimized. That is, the SINR will be the highest possible. Accordingly, the interference caused by undesired signals will be reduced. That is, the power received from a base station 102 attempting to communicate with the receiving station 110 can be maximized with respect to the power received from a base station 108 that is not attempting to communicate with the receiving station 110.

The combiner coefficient processor 224 (shown in FIG. 2b) is coupled to the second input of each multiplication module 302 by signal lines 223. It should be noted that to reduce the number of lines in FIG. 2B, a single signal line 223 is shown from the combiner coefficient processor 224 to each optimum combiner 220. However, this line 223 represent a connection over which a plurality of values of wij*(m) (six in the case shown in FIGS. 2b and 3) are provided to each multiplication module 302 in each optimum combiner 220. These values allow the multiplication modules 302 to optimally adjust the received signals before combining within a summing module 304. The summing module 304 sums the products to combine each of the received rotated signals. Accordingly, the optimum combiner 220A performs a dot product operation. The output of the summing module 304 (i.e., the output from the optimum combiner 220A) is provided as an input sample to a conventional decoding or detection module or a processor that performs conventional decoding or detection functions, such as the error correcting decoder 226. The output from the summing module 304 can be expressed as:

$$\tilde{y}(m) = w^H(m) \cdot y(m) \quad (1)$$

where H denotes the transpose conjugate; $y(m)=[y_{11}(m), y_{12}(m), \ldots y_{ij}(m), \ldots]^T$ is the vector containing the sampled received signal at each rake finger 213 associated with each antenna 112, 114 at time mT after Walsh decover; $y_{i,j}$ is the received signal in the $j^{th}$ rake finger 213 coupled to the $i^{th}$ antenna at time mT after Walsh decover; $w(m)=[w_{11}(m), w_{12}(m), \ldots w_{ij}(m), \ldots]^T$ is the vector containing the optimum combining coefficients at time mT.

It should be noted that $j^{th}$ rake finger associated with the first antenna will have the same delay as the $j^{th}$ rake finger associated with the second antenna. For example, the delay imposed by the delay module 209B associated with the $2^{nd}$ rake finger 213B which receives signals from the first antenna 112 will be the same as the delay imposed by the delay module 213E associated with the $2^{nd}$ rake finger 213E which receives signals from the second antenna 114. Accordingly, in the presently disclosed method and apparatus, each delay module 209 associated with the first antenna 112 preferably has a counter-part delay module 209 associated with the second antenna 114. Each of the modules 209 of such a pair of counter-part delay modules 209 preferably has the same delay.

After Walsh decover, the received signal at the $j^{th}$ rake finger 213 of the $i^{th}$ antenna can be represented as:

$$y_{ij}(m) = c_{ij}(m) \cdot x(m) + n_{ij}(m) \quad (2)$$

where: x(m) is the transmitted symbol at time mT; $c_{ij}(m)$ is the fading coefficient at time mT; and $n_{ij}(m)$ is a complex number representing the thermal noise plus the interference at the $j^{th}$ rake finger 213 coupled to the $i^{th}$ antenna at time mT. The fading coefficient $c_{ij}(m)$ is a complex number representing instantaneous channel gain, at a time "mT," including the effect of propagation loss, shadowing, and fast fading. In binary phase-shift keying, the symbol x(m) is a value of either +1 or −1. However, in quadrature phase-shift keying, quadrature amplitude modulation, or other such modulation techniques, the symbol x(m) belongs to a modulation constellation.

Generation of Optimum Combining Coefficients

Figure 4A:
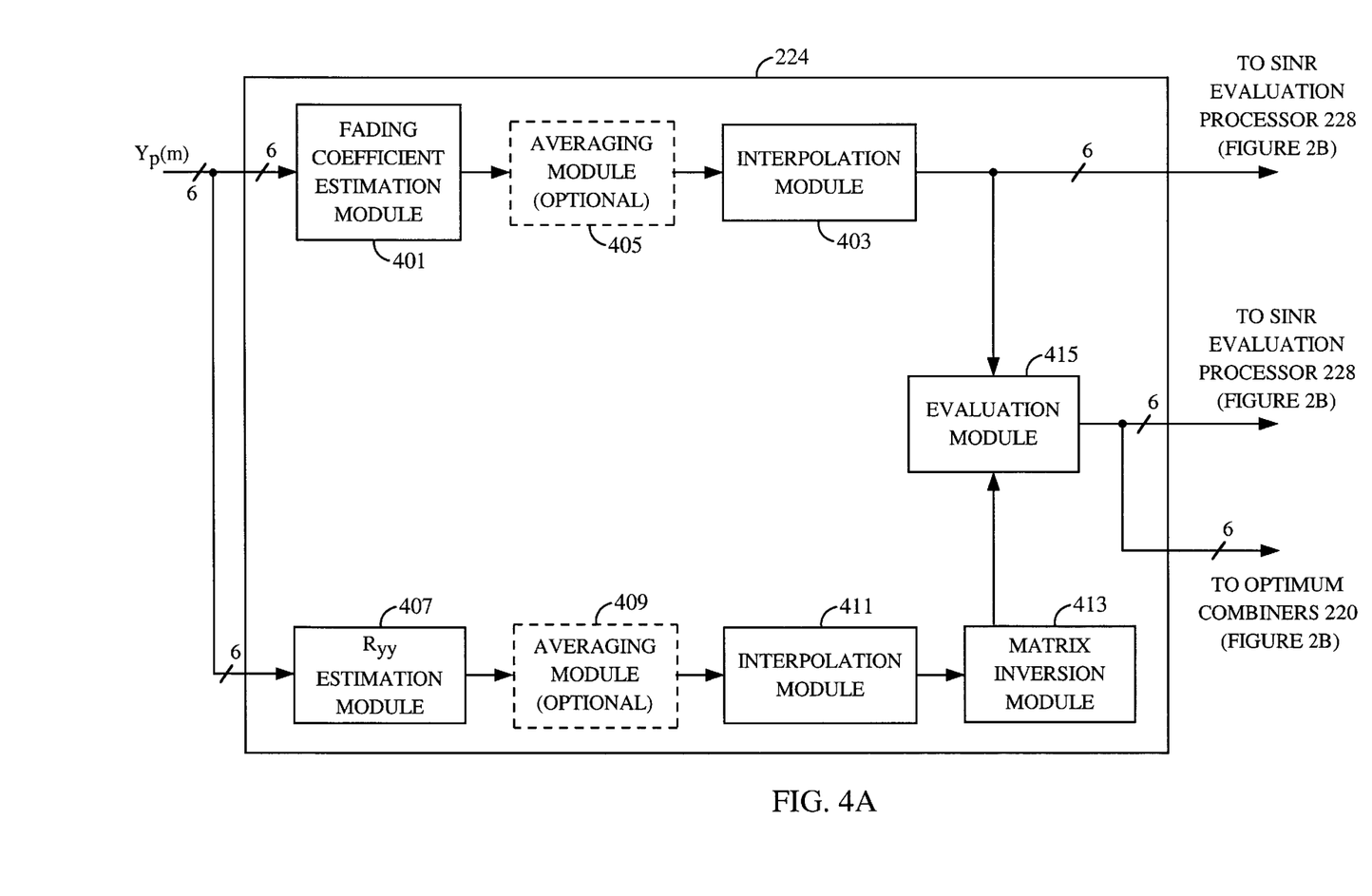
FIG. 4A is a functional block diagram of a combiner coefficient processor of one of the presently disclosed methods and apparatus.

The following is a detailed description of one disclosed method and apparatus used to determine optimum combining coefficients. FIG. 4A is a functional block diagram of a combiner coefficient processor 224 of one of the presently disclosed methods and apparatus. It should be noted that each of the optimum combiners 220 operates the same. Therefore, for simplicity, the operation of only one such optimum combiner 220 is described.

Each of the functions being performed in the modules shown in FIG. 4A may be performed by a programmable device (such as a general purpose processor or a DSP) or as dedicated hardware or programmable logic, or in any other manner that allows the function to be carried out (such as circuitry or processing functionality within an application specific integrated circuit (ASIC)). These functions may be performed by a single module, or by multiple modules. Furthermore, each such module may be physically integrated together with one or more of the other modules or may be physically independent from one or more of the other modules.

The combiner coefficient processor 224 is coupled to the two pilot/data demultiplexers 212, 214. The pilot/data demultiplexer 212 provides the pilot signals $y_{p1}(m)$ to the combiner coefficient processor 224, where $y_{p1}(m)=[y_{p11}(m), y_{p12}(m), \ldots y_{p1N}(m)]$. The pilot/data demultiplexer 214 provides the pilot signals $y_{p2}(m)$ to the combiner coefficient processor 224, where $y_{p2}(m)=[y_{p21}(m), p_{p22}(m), \ldots y_{p2N}(m)]$.

In one of the presently disclosed methods and apparatus, the values of the optimum combining coefficients are calculated as a function of an autocorrelation matrix and the cross-correlation $r_{yx}(m)$ of the received signal y(m) with the transmitted symbols x(m). In one of the presently disclosed methods and apparatus, the autocorrelation matrix is an estimate of the autocorrelation of the received signal. Accordingly, the combiner coefficient processor 224 calculates the optimum combining coefficients as:

$$w(m) = R_{yy}^{-1}(m) r_{yx}(m) \quad (3)$$

where: $R_{yy}(m)$ is the autocorrelation matrix of the vector $y(m)=[y_{11}(m), y_{12}(m), \ldots y_{ij}(m), \ldots]^T$ containing the sampled received signal at each rake finger 213 coupled to each antenna at time mT after Walsh decover (i.e. $R_{yy}(m)=E[y(m) \cdot y^H(m)]$); and $r_{yx}(m)$ is the cross-correlation between the vector y(m) and the transmitted symbol x(m) (i.e. $r_{yx}=E[y(m) \cdot x^*(m)]$, where E denotes the expectation value as defined in statistical mathematics and x*(m) denotes the complex conjugate of x(m).

Figure 4B:
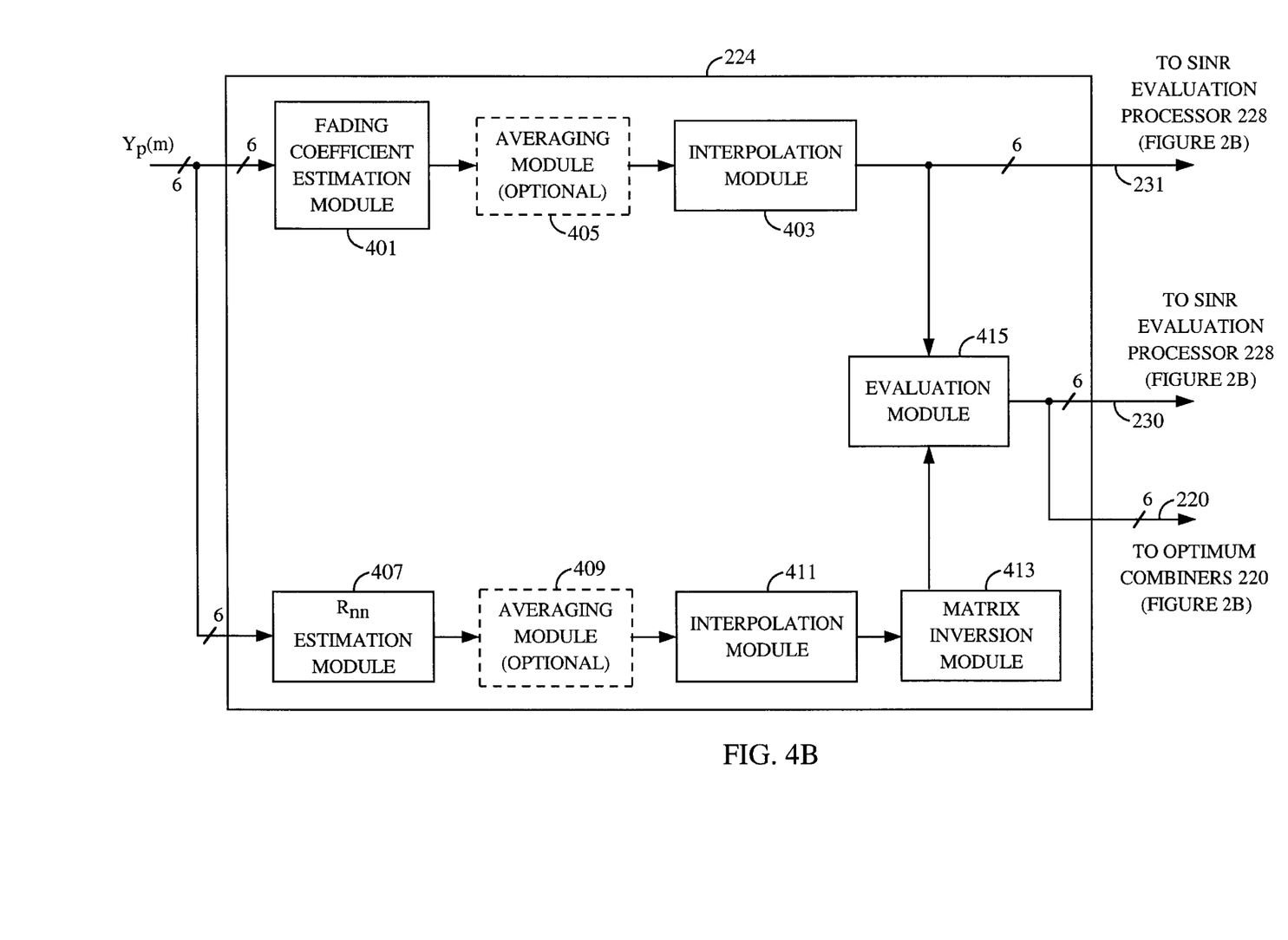
FIG. 4B is a functional block diagram of a combiner coefficient processor 224' of an alternative method and apparatus.

In an alternative method and apparatus, the values of the optimum combining coefficients are calculated by a combiner coefficient processor 224' (as shown in FIG. 4B and discussed in detail below) as:

$$w'(m) = R_{nn}^{-1}(m) r_{yx}(m) \quad (4)$$

where $R_{nn}(m)$ is the autocorrelation matrix of the thermal noise plus interference vector $n(m)=[n_{11}(m), n_{12}(m), \ldots n_{ij}(m), \ldots]^T$ (i.e. $R_{nn}(m)=E[n(m) \cdot n^H(m)]$): and $r_{yx}(m)$ is as defined above. In a system in which pilot symbols are represented by |x|=+1;

$$r_{yx} = E[y(m) x^*(m)] = c = [c_{11}(m), c_{12}(m), \ldots, c_{ij}(m), \ldots]^T \quad (4a)$$

where $c_{ij}(m)$ is the fading coefficient at time mT.

The variable w as described in equation (3) and w' as described in equation (4) only differ by a scalar factor. That is:

$$w' = (1+h)w \tag{5}$$

where: $h = c^H R_{nn}^{-1} c$.

Estimation of the Cross-Correlation $r_{yx}$

The estimations of the cross-correlation $r_{yx}$ between the received signal y(m) and the transmitted symbol x(m) is determined from the fading coefficient vector c during the pilot bursts in the forward link slot, since the cross-correlation $r_{yx}$ is equal to the vector $c = [c_{11}, c_{12}, \ldots c_{ij}, \ldots]^T$ of the fading coefficients, as described above.

The estimation of c is performed by a fading coefficient estimation module 401 using the pilot bursts of the forward link slot as follows. The fading coefficient module 401 receives each of the pilot signals $y_{p11}(m)$, $y_{p12}(m)$, ... $y_{p1N}(m)$, $y_{p21}(m)$, $y_{p22}(m)$, ... $y_{p2N}(m)$ output from each of the two pilot/data demultiplexers 212, 214. For simplicity sake, FIG. 4A shows a vector $y_p(m) = y_{p11}(m)$, $y_{p12}(m)$, ... $y_{p1N}(m)$, $y_{p21}(m)$, $y_{p22}(m)$, ... $y_{p2N}(m)$. In one of the presently described methods and apparatus, the transmitted symbol during the pilot burst is equal to a constant value of one (i.e., x=1). Therefore, each element of the fading coefficient vector $c_{ij}(m)$ can be estimated as:

$$\hat{c}_{ij} = \frac{1}{M} \sum_{m=1}^{M} y_{pij}(m) \tag{6}$$

where $\hat{c}_{ij}$ is an estimate of the fading coefficient $c_{ij}(m)$ for the pilot burst at the $j^{th}$ rake finger of the $i^{th}$ antenna, $y_{pij}(m)$ is the $m^{th}$ sample of the received signal in the pilot burst at the $j^{th}$ rake finger of the $i^{th}$ antenna, and M is the number of symbols in the pilot burst.

The fading coefficient estimate $\hat{c}_{ij}$ determined in equation (6) gives an estimate of the cross-correlation $r_{yx}$ only in the pilot bursts. Therefore, in order to perform coherent detection and determine the optimum combiner coefficients using equations (3), an estimate of the fading coefficient $\hat{c}_{ij}$ in the data chips is calculated in a first interpolation module 403.

In one of the presently disclosed methods and apparatus, an estimate of the fading coefficient $\hat{c}_{ij}$ in the data chips is made by the linear interpolation module 403 by interpolation between the estimates of two fading coefficients $\hat{c}_{ij}$ determined in consecutive pilot bursts. Alternatively, the estimate of the fading coefficient $\hat{c}_{ij}$ in the data chips is made by averaging a plurality (e.g., two or three) of fading coefficients $\hat{c}_{ij}$ in consecutive pilot bursts in an averaging module 405. An interpolation is then made between the values of two consecutively calculated averages by the interpolation module 403.

Figure 5:
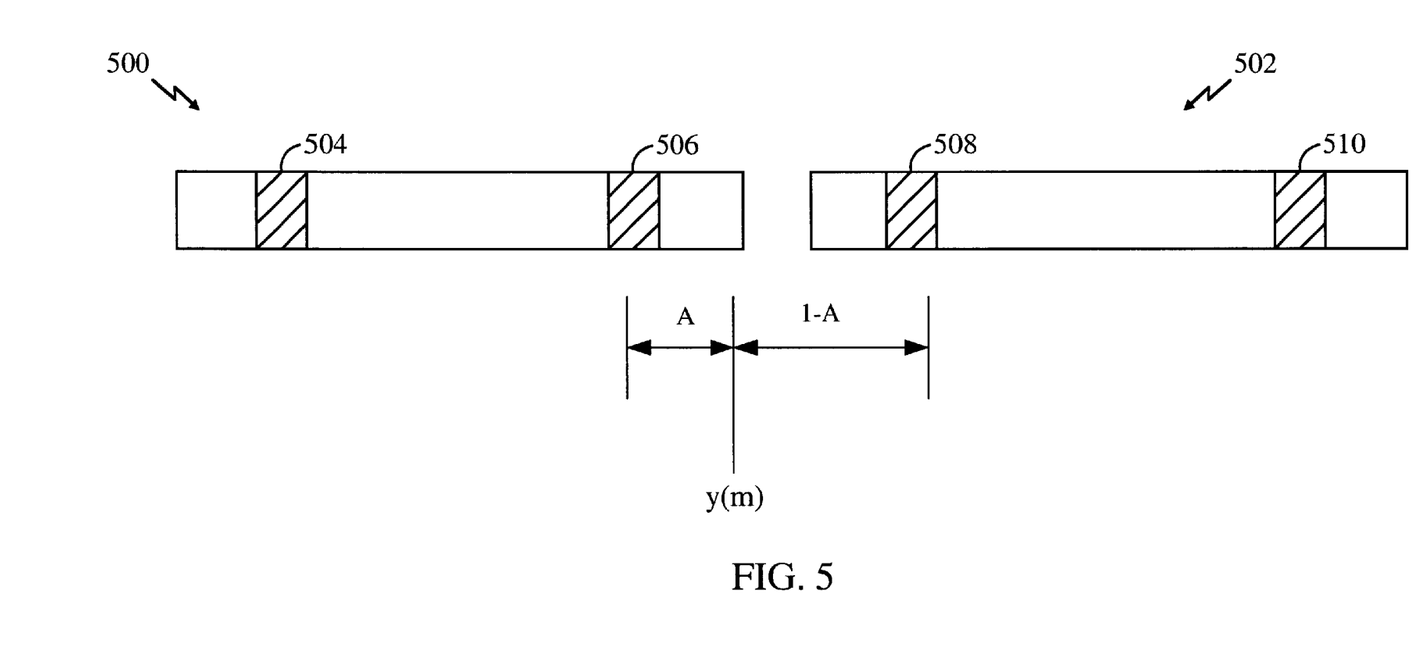
FIG. 5 is an illustration of a data field for which three consecutive fading coefficient estimates are to be averaged and then interpolating between consecutive averages.

FIG. 5 is an illustration of a data field for which three consecutive fading coefficient estimates are to be averaged and then interpolating between consecutive averages. FIG. 5 shows two forward link slots 500, 502. Each forward link slot 500, 502 has two pilot bursts 504, 506, 508, 510. The fading coefficient for each pilot burst 504, 506, 508, 510 is estimated. A first average fading coefficient estimate c(k) is calculated by taking the sum of the three estimates for the first three consecutive pilot bursts 504, 506, 508 and dividing by three. Next, a second average fading coefficient c(k+1) is calculated for the three pilot bursts 506, 508, 510 by adding the fading coefficients for each of the pilot bursts 506, 508, 510 and dividing by three. A linear interpolation is performed between the first and second average fading coefficients. To estimate the fading coefficient for a portion of data that is a distance from the pilot burst 506, the following equation is used:

$$c(m) = (1-a) \cdot c(k) + a \cdot c(k+1), \quad 0 < a < 1 \tag{7}$$

The cross-correlation vector $r_{yx}$ is calculated by repeating this procedure for each rake finger of each antenna.

Estimation of the Autocorrelation Matrix $R_{yy}$

The autocorrelation matrix of the received signal can be represented as:

$$R_{yy} = \frac{1}{M} \sum_{m=1}^{M} y(m) y^H(m) \tag{8}$$

where M is the number of samples used to perform the estimation and $y(m) = [y_{11}(m), y_{12}(m), \ldots y_{1N1}(m), y_{21}(m), y_{22}(m), \ldots y_{2N2}(m)]^T$ is the vector containing the received signal; $y_{ij}(m)$ is the received signal at the $i^{th}$ antenna and the $j^{th}$ rake receiver finger sampled at time mT after Walsh decover; $N_1$ is the number of rake fingers associated with antenna 1 and $N_2$ is the number of rake fingers associated with antenna 2.

It can be seen from equation (8) that, in the case in which $N_1 = N_2$ (i.e., the same number of fingers are used to receive the incoming signal over each of two antennas), $R_{yy}$ is a 2N×2N matrix, comprising 2×2 sub-matrices. Accordingly, the number of 2×2 sub-matrices is equal to $N^2$.

Those skilled in the art will recognize that the interference at different rake fingers of each antenna is uncorrelated, due to the differences in the propagation delays of the signals received by different rake fingers. Accordingly, the elements of the autocorrelation matrix $R_{yy}$ derived from rake fingers having different delays can be assumed to be zero. Only the estimation of 2×2 autocorrelation matrices of the signals of the rake fingers having the same delay (i.e., having $j_1 = j_2$) need be calculated:

$$R = \begin{pmatrix} R^{(1)} & 0 & \cdots & \cdots & \cdots & \cdots & 0 \\ 0 & R^{(2)} & 0 & \cdots & \cdots & \cdots & \\ \vdots & & \ddots & & & & \vdots \\ \vdots & & & R^{(s)} & & & \vdots \\ \vdots & & & & \ddots & & \vdots \\ & \cdots & \cdots & \cdots & \cdots & \ddots & \\ 0 & & & & 0 & & R^{(N)} \end{pmatrix}$$

In the presently disclosed method and apparatus using two antennas, each 2×2 sub-matrix, $R^{(s)}$ located on the diagonal of the matrix $R_{yy}$ (as shown above) can be expressed as follows:

$$R^{(s)} = \begin{pmatrix} \frac{1}{M} \sum_{m=1}^{M} |y_{1s}(m)|^2 & \frac{1}{M} \sum_{m=1}^{M} y_{1s}(m) y_{2s}^*(m) \\ \frac{1}{M} \sum_{m=1}^{M} y_{1s}^*(m) y_{2s}(m) & \frac{1}{M} \sum_{m=1}^{M} |y_{2s}(m)|^2 \end{pmatrix} \quad 1 \leq s \leq N$$

wherein $y_{1s}(m)$ is the signal at time mT received by the first antenna through the $s^{th}$ rake finger, and $y_{2s}(m)$ is the signal at time mT received by the second antenna through the $s^{th}$ rake finger. Each of the zeros shown above in the matrix R represents the assumed value of an off-diagonal 2×2 sub-matrix.

In one presently disclosed methods and apparatus, the autocorrelation matrix of the received signal is estimated by an $R_{yy}$ estimation module 407 using the pilot bursts to estimate the value of $R_{yy}$ in the data chips. However, in an alternative method and apparatus, the $R_{yy}$ estimation module uses the data chips directly, or both the pilot bursts and the data chips to determine the value of $R_{yy}$ in the data chips.

In one presently disclosed method and apparatus in which pilot bursts are used to estimate $R_{yy}$ in the data chips, an $R_{yy}$ interpolation module 411 interpolates $R_{yy}$ from the values determined in the pilot bursts. In an alternative method and apparatus, the $R_{yy}$ estimation module 407 is coupled to an $R_{yy}$ averaging module 409 that calculates an average of two or three $R_{yy}$ values determined in the pilot bursts. The averages output from the $R_{yy}$ averaging module 409 are coupled to the interpolation module 411 which interpolates the averages to determine the value of $R_{yy}$ in the data. The averaging and interpolation performed by the averaging and interpolation modules 409, 411 is essentially the same as the averaging and interpolation that is done in the averaging and interpolation modules 405, 403.

Determination of the Optimum Combining Coefficients w

The optimum combining coefficients, w are determined by a combining coefficient evaluation module 415 using either equation (3), as provided above. Once $R_{yy}$ has been estimated by the $R_{yy}$ estimation module 407 and interpolated to represent $R_{yy}$ in the data chips, the value of $R_{yy}$ is coupled to an inversion module 413 which inverts the matrix $R_{yy}$. Equation (3) is then applied to determine the optimum combining coefficients.

In yet another alternative method and apparatus, $R_{yy}$ is determined from the pilot bursts. Equation (3) is used to determine the optimum combiner coefficients in the pilot bursts. Then linear interpolation is used to determine the optimum combining coefficients in the data chips.

The computational complexity for the inversion required in equation (3) is very low due to the zeroing of all of the off-diagonal sub-matrices $R^{(s)}$ of the matrix $R_{yy}$. That is, the inversion can be performed without inverting the entire matrix $R_{yy}$. Rather, the sub-matrices $R^{(s)}$ can be separately inverted.

The algorithm described above is general and can be applied at a generic M×M autocorrelation matrix, where for the autocorrelation matrix inversion we can use the direct inversion or the well known recursive least square (RLS) algorithm.

Estimation of the Autocorrelation Matrix $R_{nn}$

FIG. 4B is a functional block diagram of a combiner coefficient processor 224' of an alternative method and apparatus. As shown in FIG. 4B, the combiner coefficient processor 224' includes essentially the same modules as the combiner coefficient processor 224 shown in FIG. 4A. However, the processor 224' of FIG. 4B includes an $R_{nn}$ estimation module 407' which calculates an estimate of an autocorrelation matrix of the noise plus interference $R_{nn}(m)$ instead of the $R_{yy}$ estimation module 407 of FIG. 4A. To estimate the autocorrelation matrix of the noise plus interference $R_{nn}(m)$, the pilot bursts are preferably used. A first formula is represented as:

$$R_{nn} = \frac{1}{M} \sum_{m=1}^{M} n(m)n^H(m) \quad (9)$$

where n(m) is the estimated noise plus interference at the receiver in a sample at time mT, and M is the number of samples used to perform the estimation (i.e. the number of symbols in the pilot burst). Each component of vector n(m) is determined by an $R_{nn}(m)$ estimation module 407' by subtracting the channel gain $c_{ij}(m)$ from the received pilot burst $y_{ij}(m)$ as follows:

$$n_{ij}(m) = y_{pij}(m) - c_{ij}(m) \quad (10)$$

where $y_{pij}(m)$ is the $m^{th}$ sample of the received signal in the pilot burst at the $j^{th}$ rake finger of the $i^{th}$ antenna after Walsh decover and $c_{ij}(m)$ is estimated by a fading coefficient estimation module 401' using formula (6) provided above. The vector n(m) is generated by repeating this procedure for each rake finger of each antenna 112, 114.

Alternatively, $R_{nn}$ may be estimated by the following equation:

$$R_{nn} = \frac{1}{2M} \sum_{m=1}^{M} n(m)n^H(m) \quad (11)$$

where each component of vector n(m) is determined by the $R_{nn}(m)$ estimation module 407' using the formula:

$$n_{ij}(m) = y_{pij}(m) - y_{pij}(m+1) \quad (12)$$

where M is the number of samples used to perform the estimation (i.e., the number of symbols in the pilot burst, less one).

According to equation (12), one pilot symbol of a rake finger of the first antenna 112 is subtracted from a next pilot symbol of the same rake finger of the same antenna 112. M is the number of samples used to perform the estimation, i.e. (the number of symbols in the pilot burst −1).

It should be noted that an alternative method for calculating $R_{nn}$ is:

$$R_{nn} = R_{yy} - c \cdot c^H \quad (13)$$

where $c \cdot c^H$ is the dot product of the fading coefficient vector with the transpose conjugate of the fading coefficient vector.

In one presently disclosed method and apparatus, the second interpolation module 411 interpolates the values of $R_{nn}$ in the pilot to determine the value of $R_{nn}$ in the data chips. Alternatively, the average module 409 averages a plurality of $R_{nn}$ values determined from the pilot (i.e., two or three pilot values of $R_{nn}$). The average is then coupled to the second interpolation module 411 which interpolates the averages to determine the value of $R_{nn}$ in the data chips, as shown and described above with reference to FIG. 5. It should be noted that with the exception of the processing that is done by the estimation modules 407, 407', and the processing done by the combining coefficient evaluation module 415, 415', the functions of the combiner coefficient processors 224, 224' are essentially identical.

In the presently disclosed method and apparatus shown in FIG. 4b, once the value of $R_{nn}$ is determined in the data chips, the matrix $R_{nn}$ is coupled to the inversion module 413. The inverted $R_{nn}$ output from the inversion module 413 is coupled to the combining coefficient evaluation module 415'. Equation (4) is then applied by the combining coefficient evaluation module 415' to determine the optimum combining coefficients w'.

Post Evaluation Interpolation

Figure 6A:
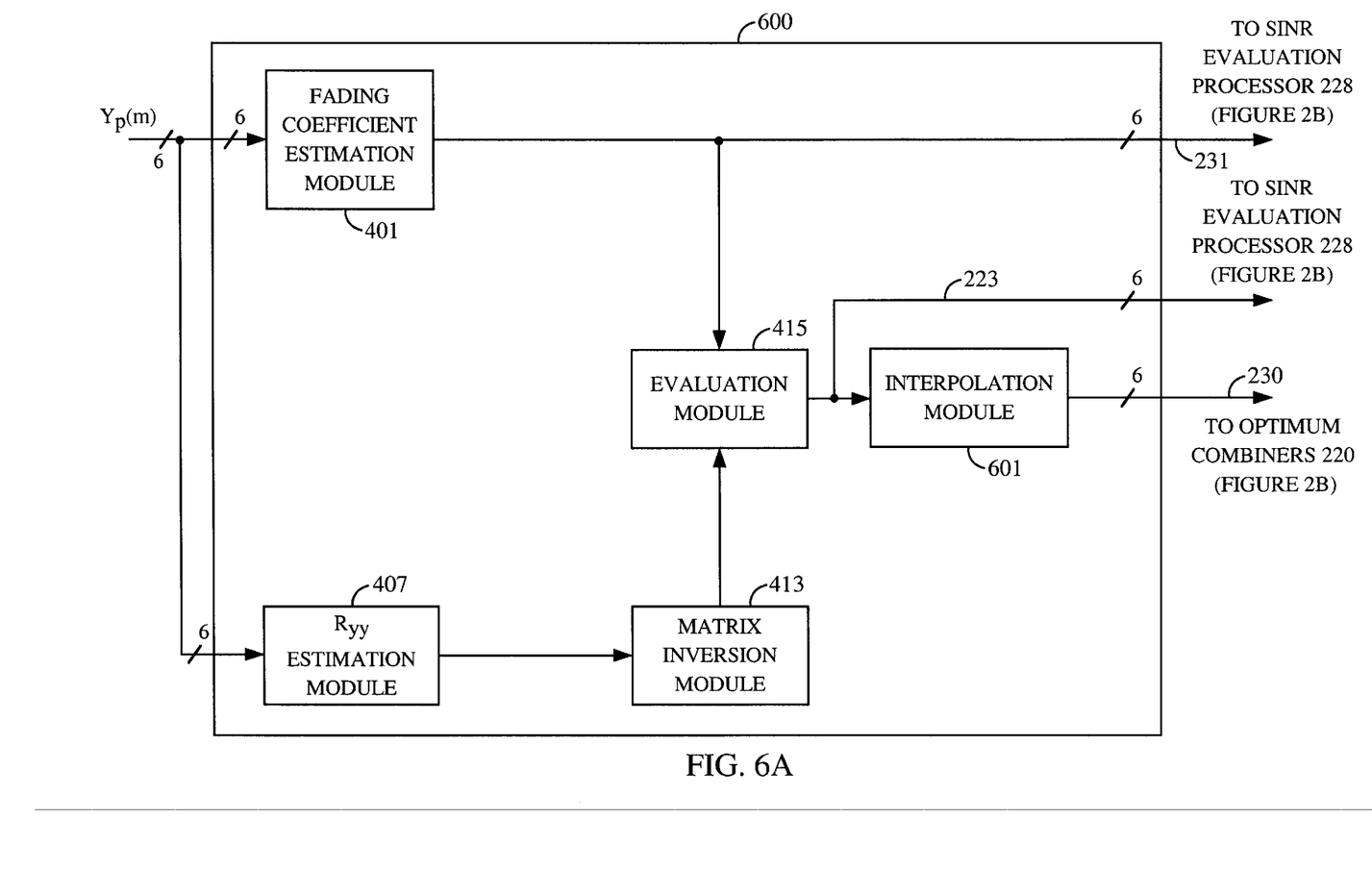
FIG. 6A is a functional block diagram of a combiner coefficient processor 600 of an alternative method and apparatus.

FIG. 6A is a functional block diagram of a combiner coefficient processor 600 of an alternative method and apparatus. As shown in FIG. 6A, the combiner coefficient processor 600 includes essentially the same modules as the combiner coefficient processor 224 shown in FIG. 4A. However, in the processor 600 of FIG. 6A, the interpolation is performed after the evaluation of the optimum combining coefficients. Accordingly, the fading coefficient estimation module 401 is coupled directly to the evaluation module 415. Likewise, the $R_{yy}$ estimation module 407 is coupled directly to the martix inversion module 413. The evaluation module 415 is then coupled to an interpolation module 601 performs a linear interpolation between the values of w output from the evaluation module 415 in order to determine the values of w during the data portions of each forward link slot.

Figure 6B:
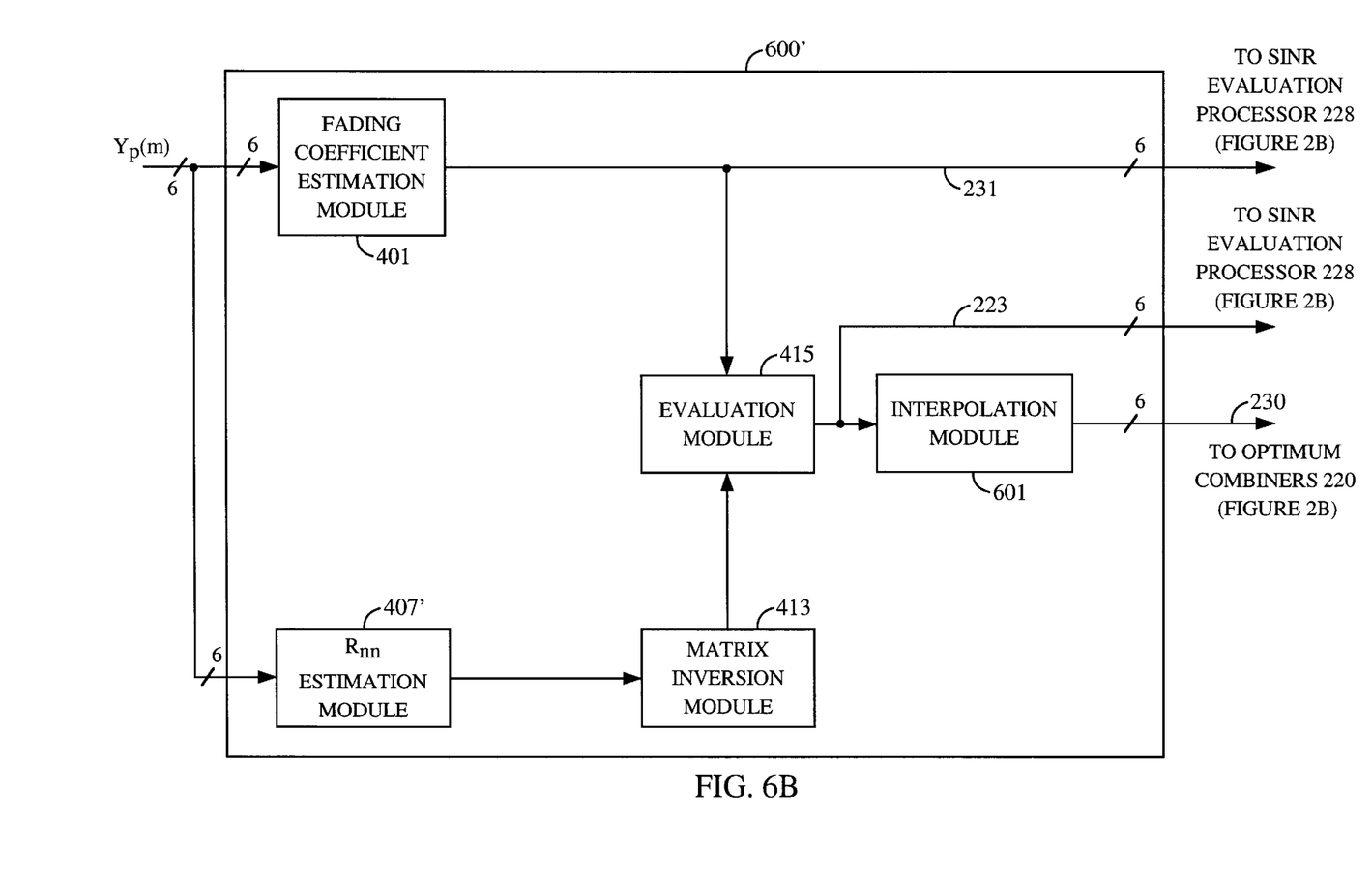
FIG. 6B is a functional block diagram of a combiner coefficient processor 600' in yet another alternative method and apparatus.

Likewise, FIG. 6b is a functional block diagram of a combiner coefficient processor 600' in yet another alternative method and apparatus. As shown in FIG. 6B, the combiner coefficient processor 600' includes essentially the same modules as the combiner coefficient processor 224' shown in FIG. 4B. However, in the processor 600' of FIG. 6B, the interpolation is performed after the evaluation of the optimum combining coefficients. Accordingly, the fading coefficient estimation module 401 is coupled directly to the evaluation module 415. Likewise, the $R_{yy}$ estimation module 407' is coupled directly to the martix inversion module 413. The evaluation module 415 is then coupled to an interpolation module 601 perform a linear interpolation between the values of w' output from the evaluation module 415 in order to determine the values of w' during the data portions of each forward link slot.

Estimation of the Signal-to-Interference-plus-Noise (SINR) Ratio

In one of the presently disclosed methods and apparatus, the values of $c_{ij}(m)$ and $w_{ij}(m)$ from the combiner coefficient processor 224 are coupled to an SINR evaluation module 228 (shown in FIG. 2B). In one of the presently disclosed methods and apparatus, a SNIR is calculated as:

$$SINR = \frac{w^H c}{1 - w^H c} \quad (14)$$

where w has been determined from equation (3) and c from equation (6).

In an alternative method and apparatus in which combiner coefficient processor 224' is used to determine w', the SINR is calculated as:

$$SINR = w'^H c \quad (15)$$

where c has been determined from (6).

In one of the presently disclosed methods and apparatus, SINR is used to determine the rate at which data can be transmitted from the base station 102 to the receiving station 110. As shown in FIGS. 2A and 2B, the combiner coefficient processor 224, 224' is coupled to a SINR evaluation module 228 by signal lines 230, 231. Signal line 230 provides the SINR evaluation module 228 with the value of either w or w', as calculated by the combiner coefficient processor 224, 224'. Signal line 231 provides the SINR evaluation module 228 with the value for $c_{ij}(m)$. The SINR evaluation module 228 determines the SINR in accordance with either equation (14) or (15). The SINR evaluation module 228 is coupled to a DRC module 232. The DRC module 232 determines the rate at which data can be received from the base station 102, taking into account the SINR of the signal being received from the base station 102. This rate is then communicated to the base station.

Calculation of LLR

Most communication systems require the evaluation of the log likelihood ratios (LLR) of the coded bits in order to perform decoding at the receiver (for example iterative or "turbo" decoding, conventional Viterbi decoding, etc.). One advantage of the presently disclosed method and apparatus is that values of LLR can be easily computed from the soft decision values represented by either w or w'.

For example, assume that quadrature phase-shift keying (QPSK) or 4-quadrature amplitude modulation (4-QAM) is used at the transmitter. Further, assume that $d_0$ and $d_1$ denote, respectively, the first and the second coded bit associated with the modulated symbol $y_{d,ij}$, mapping coded bit 0 at the input of the modulator to the modulation value +1 and coded bit 1 at the input of the modulator to the modulation value −1 (as shown in FIG. 7). Then, the values of the LLR are computed using either equations (16) and (17) or equations (18) and (19):

$$LLR(d_0|y_d(m)) = 4 \cdot Re(w'(m)^H \cdot y_d(m)) \quad (16)$$

$$LLR(d_1|y_d(m)) = 4 \cdot Im(w'(m)^H \cdot y_d(m)) \quad (17)$$

$$LLR(d_0|y_d(m)) = 4 \cdot (1+h) \cdot Re(w(m)^H \cdot y_d(m)) \quad (18)$$

$$LLR(d_1|y_d(m)) = 4 \cdot (1+h) \cdot Im(w(m)^H \cdot y_d(m)) \quad (19)$$

where H denotes the transpose conjugate; Re(.) and Im(.) denotes real part and imaginary part of a complex number, respectively; $y_d(m) = [y_{d,11}(m), y_{d,12}(m), \ldots y_{d,ij}(m), \ldots]^T$ is the vector containing the sampled received data signal at each rake finger 213 associated with each antenna 112, 114 at time mT after Walsh decover; $y_{d,ij}$ is the received data signal in the $j^{th}$ rake finger 213 coupled to the $i^{th}$ antenna at time mT after Walsh decover; $w(m) = [w_{11}(m), w_{12}(m), \ldots w_{ij}(m) \ldots]^T$ is the vector containing the optimum combining coefficients at time mT evaluated using equation (3), $w'(m) = [w'_{11}(m), w'_{12}(m), \ldots w'_{ij}(m) \ldots]^T$ is the vector containing the optimum combining coefficients at time mT evaluated using equation (4), and (1+h) has been defined in equation (5).

For BPSK signaling, only equations (16) or (18) are needed because the imaginary part is zero.

Accordingly, in one of the presently disclosed methods and apparatus, the error correcting decoder 226 performs the calculations shown in equations (16) and (17), or equations (18) and (19).

Industrial Application

Our disclosed method and apparatus is capable of exploitation in industry and can be made and used whenever is it desired to do wireless data transfer. The individual components of the apparatus and method shown herein, taken separate and apart from one another, may be entirely conventional, it being their combination, which we claim as our invention.

While we have describe various modes of apparatus and method, the true spirit and scope of our invention is not limited thereto, but is limited only by the following claims and their equivalents, and we claim such as our invention.

What is claimed is:

1. In a wireless communication receiver, the method comprising:

receiving a plurality of signals at the receiver;

sampling the plurality of signals to generate sampled signals to the receiver;

determining weights for the plurality of signals, comprising:

estimating an autocorrelation of the sampled signals;

estimating a cross correlation between the sampled signals and corresponding transmitted signals; and calculating the weights as a product of the autocorrelation and the cross correlation;

receiving data signals at the receiver, the data signals having corresponding transmitted data signals; and applying the weights to the data signals to generate an estimate of the transmitted data signals.

2. The method as in claim 1, wherein the cross correlation is a function of fading coefficients.

3. The method as in claim 1, further comprising:

rotating the phase of the sampled signal.

4. The method as in claim 1, wherein the plurality of signals received at the receiver includes information known a priori by the receiver.

5. The method as in claim 4, wherein the information corresponds to a pilot sequence.

6. In a wireless communication receiver, the method comprising:

receiving a plurality of signals at the receiver;

sampling the plurality of signals to generate sampled signals to the receiver;

determining weights for the plurality of signals, comprising:

estimating an autocorrelation of the noise received at the receiver;

estimating a cross correlation between the sampled signals and corresponding transmitted signals; and calculating the weights as a product of the autocorrelation and the cross correlation;

receiving data signals at the receiver, the data signals having corresponding transmitted data signals; and applying the weights to the data signals to generate an estimate of the transmitted data signals.

7. The method as in claim 6, wherein the cross correlation is a function of fading coefficients.

8. The method as in claim 7, wherein the receiver includes a rake type receiver having a plurality of fingers, further comprising:

estimating the fading coefficients per each finger of the plurality of fingers of the rake type receiver.

9. A wireless receiver apparatus, comprising:

receiver means for processing a plurality of signal paths;

sampling means for sampling a plurality of signals to generate sampled signals;

weight calculation means for calculating weights for the plurality of signals, comprising:

first estimation means for estimating an autocorrelation of the sampled signals;

second estimation means for estimating a cross correlation between the sampled signals and corresponding transmitted signals; and weight processing means for calculating the weights as a product of the autocorrelation and the cross correlation; and weighting means for applying the weights to data signals received at the apparatus and for generating an estimate of corresponding transmitted data signals.

10. The wireless receiver apparatus of claim 9, wherein the first estimation means calculates the autocorrelation as $$R_{yy} = \frac{1}{M}\sum_{m=1}^{M} y(m)y^H(m),$$

wherein y(m) is a sampled signal, and M is a total number of samples.

11. The wireless receiver apparatus of claim 9, wherein the second estimation means calculates the cross correlation as:

$$r_{yx}=E\ [y(m)\ x^*(m)]=c=[c_{11}(m),c_{12}(m),\ \ldots\ ,c_{ij}(m)\ldots\ ]^T,$$

wherein E[ ] is an estimation operator, y(m) is a sampled signal, and x(m) is a transmitted signal.

* * * * *